(12) United States Patent
Hacking

(10) Patent No.: US 9,189,302 B2
(45) Date of Patent: *Nov. 17, 2015

(54) TECHNIQUE FOR MONITORING ACTIVITY WITHIN AN INTEGRATED CIRCUIT

(71) Applicant: Intel Corporation, Santa Clara, CA (US)

(72) Inventor: Lance Hacking, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/167,688

(22) Filed: Jan. 29, 2014

(65) Prior Publication Data

US 2014/0149999 A1 May 29, 2014

Related U.S. Application Data

(63) Continuation of application No. 12/042,992, filed on Mar. 5, 2008, now Pat. No. 8,656,411.

(51) Int. Cl.
*G06F 9/54* (2006.01)
*G06F 11/30* (2006.01)
*G06F 11/34* (2006.01)
*G06F 11/36* (2006.01)

(52) U.S. Cl.
CPC ............... *G06F 9/542* (2013.01); *G06F 11/30* (2013.01); *G06F 11/3466* (2013.01); *G06F 2201/86* (2013.01); *G06F 2201/88* (2013.01); *G06F 2201/885* (2013.01)

(58) Field of Classification Search
None
See application file for complete search history.

(56) References Cited

U.S. PATENT DOCUMENTS

| | | | |
|---|---|---|---|
| 4,435,759 A | | 3/1984 | Baum et al. |
| 5,557,548 A | * | 9/1996 | Gover et al. ................ 702/176 |
| 5,657,253 A | | 8/1997 | Dreyer et al. |
| 5,732,273 A | | 3/1998 | Srivastava et al. |
| 5,774,724 A | | 6/1998 | Heisch |
| 6,098,169 A | | 8/2000 | Ranganathan |
| 6,253,338 B1 | * | 6/2001 | Smolders ........................ 714/45 |
| 6,269,401 B1 | | 7/2001 | Fletcher et al. |
| 6,351,724 B1 | | 2/2002 | Klassen et al. |
| 6,542,985 B1 | | 4/2003 | Johnson et al. |
| 6,678,777 B2 | | 1/2004 | Rao et al. |
| 6,801,940 B1 | | 10/2004 | Moran et al. |
| 6,901,582 B1 | | 5/2005 | Harrison |
| 7,356,736 B2 | | 4/2008 | Natvig |
| 7,360,011 B2 | | 4/2008 | Jeddeloh |
| 7,451,070 B2 | | 11/2008 | Devins et al. |
| 7,457,722 B1 | | 11/2008 | Shain et al. |
| 7,461,383 B2 | | 12/2008 | Gara et al. |
| 7,490,117 B2 | | 2/2009 | Subramoney et al. |
| 7,526,757 B2 | | 4/2009 | Levine et al. |
| 7,533,213 B2 | | 5/2009 | Jeddeloh |
| 7,887,759 B2 | | 2/2011 | Triplett |
| 7,895,382 B2 | | 2/2011 | DeWitt, Jr. |
| 8,069,372 B2 | | 11/2011 | Natvig |
| 2002/0124237 A1 | | 9/2002 | Sprunt et al. |

* cited by examiner

*Primary Examiner* — Andy Ho
*Assistant Examiner* — Abdou Seye
(74) *Attorney, Agent, or Firm* — Vecchia Patent Agent, LLC

(57) ABSTRACT

A technique to monitor events within a computer system or integrated circuit. In one embodiment, a software-accessible event monitoring storage and hardware-specific monitoring logic are selectable and their corresponding outputs may be monitored by accessing a counter to count events corresponding to each of software-accessible storage and hardware-specific monitoring logic.

13 Claims, 4 Drawing Sheets

TECHNIQUE FOR MONITORING ACTIVITY WITHIN AN INTEGRATED CIRCUIT

The present application is a continuation of U.S. patent application Ser. No. 12/042,992, filed on Mar. 5, 2008, entitled "TECHNIQUE FOR MONITORING ACTIVITY WITHIN AN INTEGRATED CIRCUIT," which is hereby incorporated herein by reference.

FIELD OF THE INVENTION

Embodiments of the invention relate generally to the field of information processing and more specifically, to the field of performance and event monitoring in computing systems and microprocessors.

BACKGROUND

Computer programs have benefited from performance and event monitoring in order to optimize code, provide performance information, and improve computing efficiency. Some prior art techniques may require function-specific hardware to monitor a particular activity, such as cache misses. This can be somewhat limiting and an inefficient use of hardware resources.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION

Figure 1:
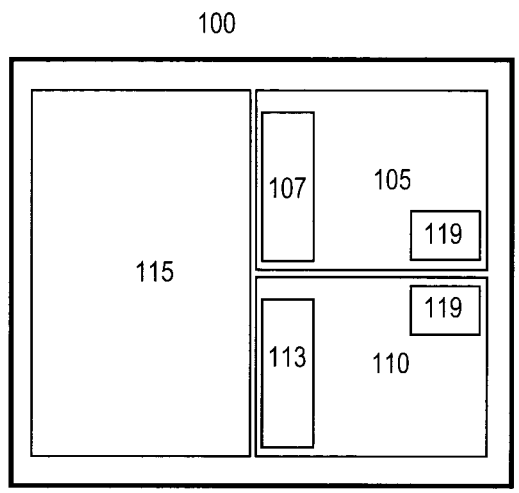
FIG. 1 illustrates a block diagram of a microprocessor, in which at least one embodiment of the invention may be used.

FIG. 1 illustrates a microprocessor in which at least one embodiment of the invention may be used. In particular, FIG. 1 illustrates microprocessor 100 having one or more processor cores 105 and 110, each having associated therewith a local cache 107 and 113, respectively. Also illustrated in FIG. 1 is a shared cache memory 115 which may store versions of at least some of the information stored in each of the local caches 107 and 113. In some embodiments, microprocessor 100 may also include other logic not shown in FIG. 1, such as an integrated memory controller, integrated graphics controller, as well as other logic to perform other functions within a computer system, such as I/O control. In one embodiment, each microprocessor in a multi-processor system or each processor core in a multi-core processor may include or otherwise be associated with logic 119 to enable activity monitoring techniques, in accordance with at least one embodiment. The logic may include circuits to enable hardware-specific activity indicators to be monitored, re-configurable activity indicators to be monitored, or a combination thereof.

In one embodiment, logic may be used within or outside of an integrated circuit to allow both hardware-specific monitoring and software-configurable activity monitoring to assist in the improvement or optimization of software programs, such as applications, operating systems, BIOS, firmware, etc. For example, in one embodiment, the logic 119 includes a register or other storage in which occurrences of some software event or events may be counted. For example, in one embodiment, a software routine may write a "1" into a monitoring register each time the routine is entered and cleared each time it is exited. The occurrence of the "1" or the clearing of the "1" may be counted to give an indication of how frequently the routine is invoked or exited. For example, the routine could be a handler or similar routine to tell programmers how often a particular fault or event yield is invoked. In one embodiment, the storage may contain a number of registers to store a number of indications of various software-configurable events, which of which may be counted along with hardware-specific monitoring events. In this manner, at least one embodiment of the invention allows for both non-configurable and re-configurable event and activity monitoring techniques to be used in conjunction with each other.

Figure 2:
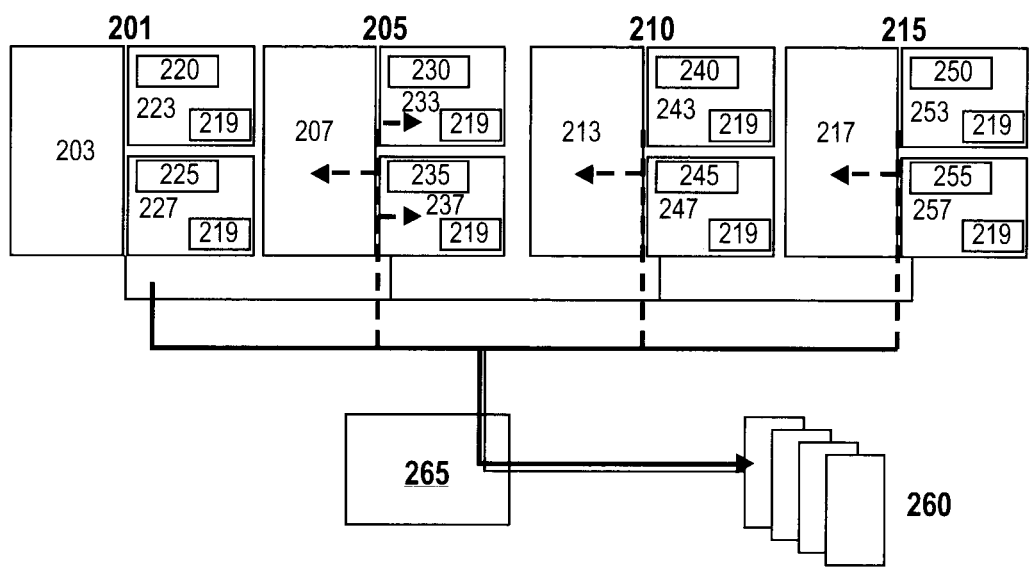
FIG. 2 illustrates a block diagram of a shared bus computer system, in which at least one embodiment of the invention may be used.

FIG. 2, for example, illustrates a front-side-bus (FSB) computer system in which one embodiment of the invention may be used. Any processor 201, 205, 210, or 215 may access information from any local level one (L1) cache memory 220, 225, 230, 235, 240, 245, 250, 255 within or otherwise associated with one of the processor cores 223, 227, 233, 237, 243, 247, 253, 257. Furthermore, any processor 201, 205, 210, or 215 may access information from any one of the shared level two (L2) caches 203, 207, 213, 217 or from system memory 260 via chipset 265. One or more of the processors in FIG. 2 may include or otherwise be associated with logic 219 to monitor hardware-specific or software re-configurable activity.

Figure 3:
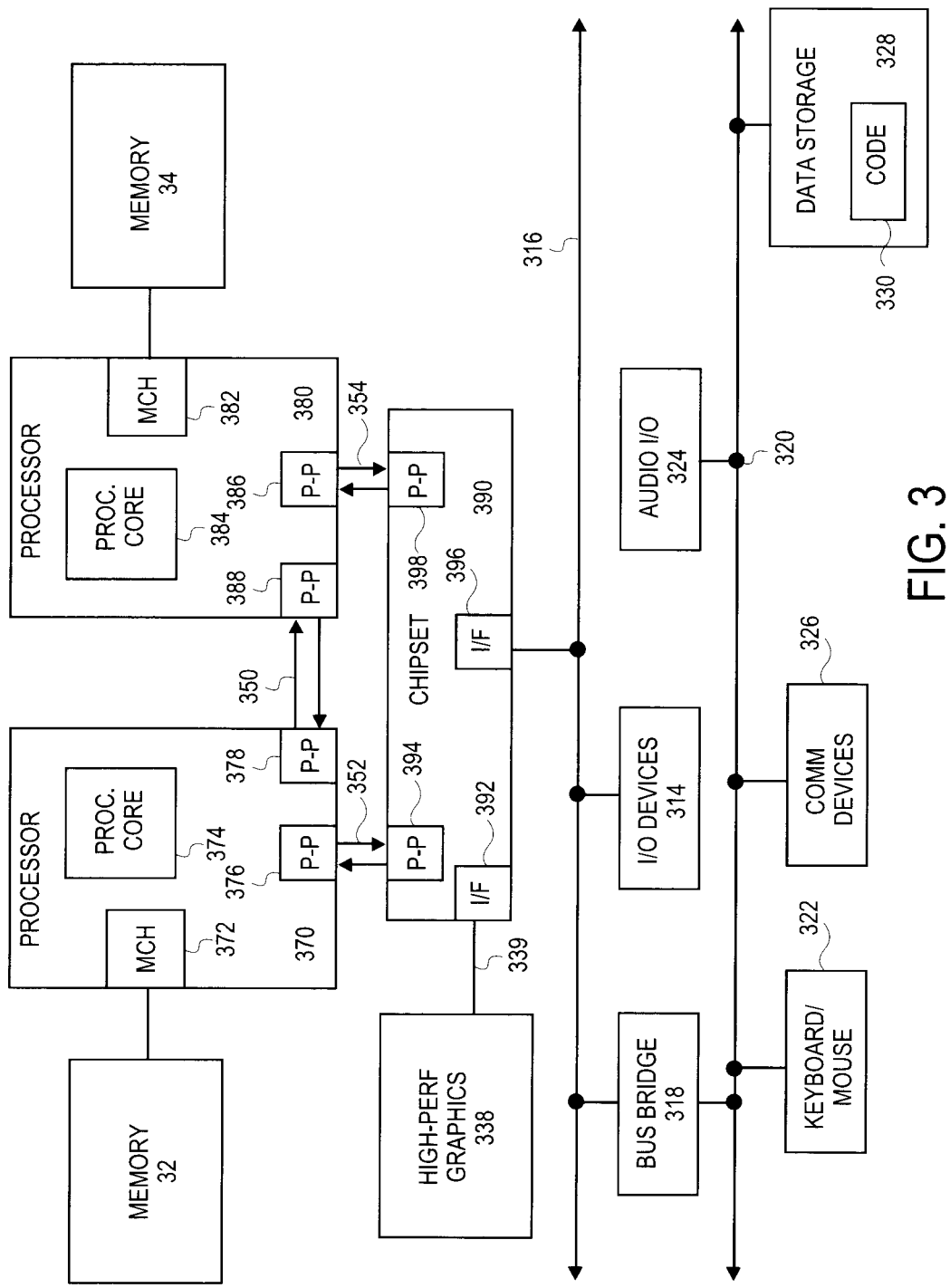
FIG. 3 illustrates a block diagram a point-to-point interconnect computer system, in which at least one embodiment of the invention may be used.

In addition to the FSB computer system illustrated in FIG. 2, other system configurations may be used in conjunction with various embodiments of the invention, including point-to-point (P2P) interconnect systems and ring interconnect systems. The P2P system of FIG. 3, for example, may include several processors, of which only two, processors 370, 380 are shown by example. Processors 370, 380 may each include a local memory controller hub (MCH) 372, 382 to connect with memory 32, 34. Processors 370, 380 may exchange data via a point-to-point (PtP) interface 350 using PtP interface circuits 378, 388. Processors 370, 380 may each exchange data with a chipset 390 via individual PtP interfaces 352, 354 using point to point interface circuits 376, 394, 386, 398. Chipset 390 may also exchange data with a high-performance graphics circuit 338 via a high-performance graphics interface 339. Embodiments of the invention may be located within any processor having any number of processing cores, or within each of the PtP bus agents of FIG. 3. In one embodiment, any processor core may include or otherwise be associated with a local cache memory (not shown). Furthermore, a shared cache (not shown) may be included in either processor outside of both processors, yet connected with the processors via p2p interconnect, such that either or both processors' local cache information may be stored in the shared cache if a processor is placed into a low power mode. One or more of the processors or cores in FIG. 3 may include or otherwise be associated with logic 319 to monitor activity within a processor or other integrated circuit within the system. The logic may include or be associated with storage, such as one or more registers, to store software-configurable events, selection logic to choose between the software-configurable events and hardware-specific events, and one or more counters to count the occurrence of each.

Figure 4:
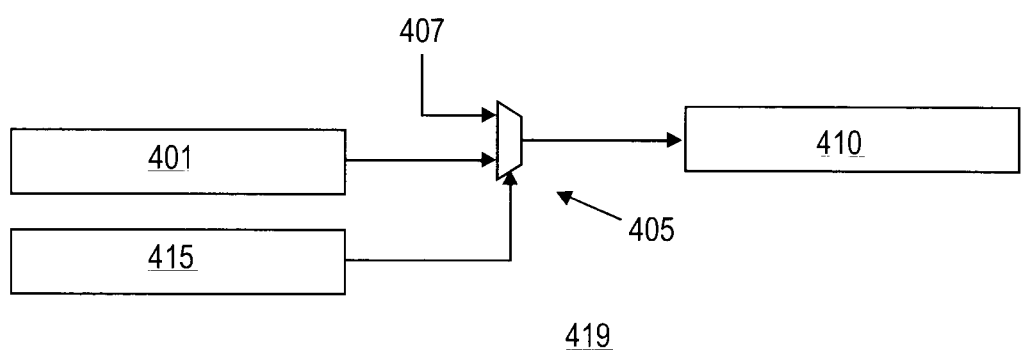
FIG. 4 illustrates a block diagram of logic, in which at least one embodiment of the invention may be implemented.

FIG. 4 illustrates logic to perform at least one embodiment of the invention. In one embodiment, the logic 419 includes a register or other storage 401 to store indications of various events that occur within an integrated circuit or system with which it is associated. For example, in one embodiment, the storage may be a register to store a plurality of bits, each of which may be associated at any given time with a particular event that is to be monitored. For example, in one embodiment, one bit position of register 401 may store a bit that may be updated by a user's program or application, micro-code, a processor instruction, firmware, BIOS, or other code to indicate when the particular code performs a particular code segment or routine. For example, in one embodiment a bit of register 401 is set to a "1" whenever a routine, such as a handler routine, is entered, and set to a "0" whenever the handler routine exits. In other embodiments, other software-configured events may be monitored. Logic 419 also includes, in one embodiment, a selection logic 405 to select between the software-configurable event monitoring storage 401 and some other hardware-specific activity monitoring logic, such as logic to indicate when a cache miss occurs. The selection logic may be configured by a control register or storage 415, which causes the selection logic to select either the output of the software-configurable monitoring storage 401 or the hardware-specific activity monitoring logic output 407. Logic 419 may also include a counter 410 or storage area to store a count value for each of the events being monitored. For example, in one embodiment, counter 410 may be used to count the number of times a "1" is set or reset in one bit position of software-configurable event monitoring storage 401 in order to yield an idea of how many times a certain routine is entered or exited. Other occurrences of other events may be counted by 419, depending on what bit within storage 401 is being counted or what hardware event output 407 is being selected and counted. Software can then read the counter 410 to gain some information about the monitored activity and adjust the code or hardware in response thereto.

In one embodiment, the counter 410 may be a number of counters, each working in conjunction or separately to count the various events. Event counter 410 may also be a timer counter to simply count up or count down a constant rate to time the difference between to two events occurring. For example, in one embodiment, the counter 410 starts counting at a constant rate when a "1" is written into a bit position of the software-configurable storage 401 indicating the start of a software routine, and the counter 410 stops counting when a "0" is entered in the same bit position of the storage 401, indicating the end of the software routine. Furthermore, storage 401 may include a number of memory locations or registers to store a number of different event occurrence indications. In one embodiment, extra combination logic (not shown) may be used in conjunction with logic 419 to track indications of a number of or combinations of events. For example, in one embodiment, combination logic could be used to indicate when a software routine enters (as indicated in a bit of storage 401) and when some other hardware-specific function occurs (as indicated by signal 407). Other logic may be used in conjunction with logic 419 to provide further hardware-specific events, software-configurable events, or a combination thereof, to be monitored.

Figure 5:
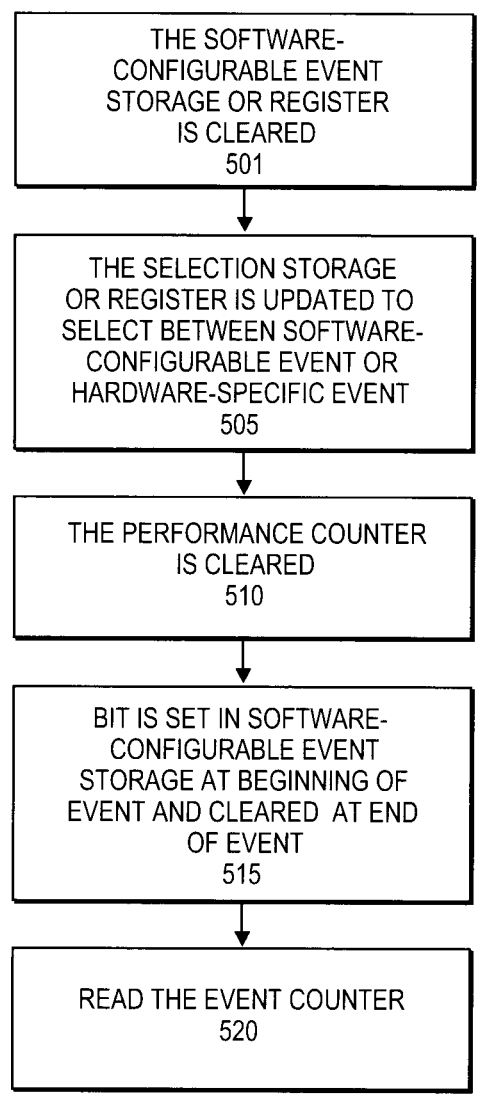
FIG. 5 is a flow diagram of operations that may be used for performing at least one embodiment of the invention.

FIG. 5 illustrates a flow diagram of operations that may be used in conjunction with at least one embodiment of the invention, regardless of the processor or system configuration in which the embodiment is used. At operation 501, the software-configurable event storage or register is cleared. At operation 505, the selection storage or register is updated to select between a software-configurable event or hardware-specific event. At operation 510, the performance counter is cleared. At operation 515, code, such as a user program, micro-code, firmware, BIOS, etc, sets a "1" in a bit position of the software-configurable event storage when the event counter is to start counting and a "0" in that position when the event counter is to stop counting. At operation 520, software or some other agent may read the event counter to glean something about the performance of the event the counter was monitoring.

One or more aspects of at least one embodiment may be implemented by representative data stored on a machine-readable medium which represents various logic within the processor, which when read by a machine causes the machine to fabricate logic to perform the techniques described herein. Such representations, known as "IP cores" may be stored on a tangible, machine readable medium ("tape") and supplied to various customers or manufacturing facilities to load into the fabrication machines that actually make the logic or processor.

Thus, a method and apparatus for directing micro-architectural memory region accesses has been described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A processor comprising:
   at least one processor core;
   hardware-specific monitor logic to monitor hardware-specific events;
   a software-accessible register that is to have a plurality of bits, the software-accessible register accessible to software, wherein each of the plurality of bits is to correspond at a given time to a different software event, wherein a first bit in the software-accessible register is to store an indication of an occurrence of a corresponding software event in the software and is to be written by the software when the corresponding software event has occurred in the software to indicate that the corresponding software event has occurred, and wherein a second bit in the software-accessible register is to store an indication of an occurrence of a corresponding combination of events including a corresponding software event in the software and a corresponding hardware-specific event to be monitored by the hardware-specific monitor logic; and
   an event counter including hardware, the event counter coupled with the software-accessible register and with the hardware-specific monitor logic, the event counter to count events associated with the second bit, wherein the event counter is to one of: (1) start to count after the second bit is set, and stop counting after the second bit is cleared; and (2) count a number of times the second bit is one of set to 1 and cleared to 0.

2. The processor of claim 1, wherein the event counter is to start counting after the occurrence of the combination of events.

3. The processor of claim 1, wherein the software event of the combination of events comprises entrance into a software routine.

4. The processor of claim 1, wherein the software event corresponding to the first bit is software configurable.

5. The processor of claim 1, further comprising a selection logic coupled with the software-accessible register and the hardware-specific monitor logic, the selection logic to be configured by the software to select between the hardware-specific monitor logic and the software-accessible register.

6. A processor comprising:
 a hardware-specific activity monitor logic output;
 a software-accessible storage that is to have a plurality of bits, wherein the software-accessible storage comprises a register, the software-accessible storage accessible to software to allow the software to store indications of occurrences of different software events within the software, wherein the plurality of bits are to be updated by the software when the different software events occur within the software to indicate that the software events have occurred;
 a selection logic coupled with the software-accessible storage and with the hardware-specific activity monitor logic output, the selection logic to select between an output of the software-accessible storage and the hardware-specific activity monitor logic output; and
 an event counter including hardware, the event counter coupled with the software-accessible storage and with the hardware-specific activity monitor logic output, the event counter to count events associated with a selected one of the software-accessible storage and the hardware-specific activity monitor logic output, wherein, when the software-accessible storage is the selected one, the event counter is to start to count after a first bit in the software-accessible storage is set, and is to stop counting after the first bit is cleared.

7. The processor of claim 6, wherein the selection logic is to be configured by the software to select between the output of the software-accessible storage and the hardware-specific activity monitor logic output.

8. The processor of claim 6, wherein the first bit in the software-accessible storage is configurable by the software to be used to store indications of occurrences of different software events.

9. The processor of claim 6, wherein the first bit in the software-accessible storage is to be updated in conjunction with a routine being entered.

10. A processor comprising:
 a hardware-specific activity monitor logic output;
 a software-accessible storage that is to have a plurality of bits, wherein the software-accessible storage comprises a register, the software-accessible storage accessible to software to allow the software to store indications of occurrences of different software events within the software, wherein the plurality of bits are to be updated by the software when the different software events occur within the software to indicate that the software events have occurred;
 a selection logic coupled with the software-accessible storage and with the hardware-specific activity monitor logic output, the selection logic to select between an output of the software-accessible storage and the hardware-specific activity monitor logic output; and
 an event counter including hardware, the event counter coupled with the software-accessible storage and with the hardware-specific activity monitor logic output, the event counter to count events associated with a selected one of the software-accessible storage and the hardware-specific activity monitor logic output, wherein, when the software-accessible storage is the selected one, the event counter is to count a number of times a first bit in the software-accessible storage is one of set to 1 and cleared to 0.

11. The processor of claim 10, wherein the selection logic is to be configured by the software to select between the output of the software-accessible storage and the hardware-specific activity monitor logic output.

12. The processor of claim 10, wherein first bit in the software-accessible storage is configurable by the software to be used to store indications of occurrences of different software events.

13. The processor of claim 10, wherein first bit in the software-accessible storage is to be updated in conjunction with a routine being entered.

* * * * *